US008488141B2

(12) United States Patent
Kaneko

(10) Patent No.: US 8,488,141 B2
(45) Date of Patent: Jul. 16, 2013

(54) IMAGE FORMING APPARATUS, IMAGE FORMATION CONTROLLING METHOD, AND COMPUTER READABLE MEDIUM STORING INSTRUCTIONS FOR PERFORMING THE IMAGE FORMATION CONTROLLING METHOD

(75) Inventor: Masaru Kaneko, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 638 days.

(21) Appl. No.: 12/479,033

(22) Filed: Jun. 5, 2009

(65) Prior Publication Data

US 2009/0303517 A1 Dec. 10, 2009

(30) Foreign Application Priority Data

Jun. 9, 2008 (JP) ................................ 2008-151132

(51) Int. Cl.

*G06K 15/00* (2006.01)
*G06F 3/12* (2006.01)
*H04N 1/00* (2006.01)
*B41J 2/35* (2006.01)

(52) U.S. Cl.

USPC ....... 358/1.14; 358/1.15; 358/1.12; 358/1.11; 358/441; 347/211

(58) Field of Classification Search

USPC ............... 358/1.15, 1.14, 1.17, 1.16; 347/211
See application file for complete search history.

(56) References Cited

U.S. PATENT DOCUMENTS

| | | | | |
|---|---|---|---|---|
| 5,167,014 | A * | 11/1992 | Shimomura | 358/1.12 |
| 5,821,974 | A * | 10/1998 | Iga et al. | 347/211 |
| 6,262,805 | B1 * | 7/2001 | Ishikawa et al. | 358/1.15 |
| 7,929,160 | B2 * | 4/2011 | Burkes et al. | 358/1.15 |
| 2002/0171868 | A1 * | 11/2002 | Yoshimura et al. | 358/1.15 |
| 2003/0035130 | A1 * | 2/2003 | Able et al. | 358/1.14 |
| 2005/0157326 | A1 * | 7/2005 | Lee | 358/1.14 |
| 2006/0164679 | A1 * | 7/2006 | Kim et al. | 358/1.15 |
| 2008/0170258 | A1 * | 7/2008 | Yamamura | 358/1.15 |
| 2009/0021786 | A1 | 1/2009 | Kaneko | |

FOREIGN PATENT DOCUMENTS

| | | |
|---|---|---|
| JP | 2001-166636 A | 6/2001 |
| JP | 2002-49202 | 2/2002 |
| JP | 2003-011473 A | 1/2003 |
| JP | 2004-127150 A | 4/2004 |

OTHER PUBLICATIONS

Japanese Office Action Dispatch No. 498639 issued by the Japan Patent Office on Jul. 20, 2012 for Japanese patent application No. 2008-151132, filed Jun. 9, 2008.

* cited by examiner

*Primary Examiner* — Akwasi M Sarpong
(74) *Attorney, Agent, or Firm* — Oblon, Spivak, McClelland, Maier & Neustadt, L.L.P.

(57) ABSTRACT

An image forming apparatus including a controller generating image data and a print control signal and outputs the image data and the print control signal together with a print request; and an engine driving print process devices to perform print processing according to the image data. Upon receipt of the print request, the engine initiates the print process devices to print an image according to the image data. When receiving no next print request within a predetermined waiting time, the engine inquires the controller whether there is a next page image to be printed. When receiving a response from the controller such that there are next page image data, the engine sets a predetermined second waiting time while stopping termination of the print process devices for the predetermined second waiting time.

11 Claims, 9 Drawing Sheets

IMAGE FORMING APPARATUS, IMAGE FORMATION CONTROLLING METHOD, AND COMPUTER READABLE MEDIUM STORING INSTRUCTIONS FOR PERFORMING THE IMAGE FORMATION CONTROLLING METHOD

BACKGROUND OF THE INVENTION

1. Field of the Invention

The present invention relates to an image forming apparatus, an image formation controlling method, and a computer readable medium storing instructions for performing the image formation controlling method.

2. Discussion of the Background

Image forming apparatus such as printers, copiers, complex image forming machines include a controller and an engine. For example, in electrophotographic image forming apparatus, the engine includes a print processing section, which performs print processing on a receiving material such as paper sheets according to image data using print process devices including a photoreceptor, a charger, an optical writing device, a developing device, a separating device, a fixing device, a cleaner, etc.; and a controlling device. The controlling device of the engine is configured to communicate with the controller to receive control signals, image data and a print request, which are necessary for image formation processing (i.e., print processing). Next, the controlling device performs image formation controlling so that the charger uniformly charges the entire surface of the photoreceptor; the optical writing device imagewise irradiates the charged photoreceptor with light to form an electrostatic latent image thereon; the developing device develops the electrostatic latent image with a developer including a toner to form a toner image on the photoreceptor; a receiving material feeding device feeds a sheet of a receiving material; the transfer device transfers the toner image on the photoreceptor onto the thus fed receiving material sheet; and a fixing device fixes the toner image on the receiving material sheet upon application of heat and pressure thereto, resulting in formation of the image on the receiving material sheet. Such an image forming apparatus is disclosed, for example, in a published unexamined Japanese patent application No. 2002-49202.

In one printing job of such a background image forming apparatus, the time (i.e., next print request waiting time (or waiting time)) from receipt of a print request from the controller and start of the print processing to the next print request is checked to determine whether or not the next print request is made within the waiting time. If the next print request is not received from the controller within the waiting time, the controlling device of the engine judges that the image data under processing are the last page data of the print job, and performs a termination processing in which the above-mentioned series of printing processes (print process devices) are terminated. When a next print request is received from the controller in this termination processing, the image forming apparatus cannot start the start-up (initiation) processing for the next print process. Therefore, in this case, after the apparatus completes the termination processing for the former print process, the apparatus starts the start-up processing for the next print process.

Specifically, if the data sent to the controller are such that the time needed for forming image data from the data in the controller is relatively long, a problem in that the next print request for the image data is not sent to the engine within the waiting time occurs. In this case, the apparatus starts to perform the termination processing. Therefore, the print processing for the next image has to be performed after the termination processing and the subsequent start-up processing for the next print process, resulting in reduction of the print speed and productivity of the image forming apparatus. In addition, another problem in that due to repetition of the termination processing and the subsequent start-up processing, the lives of the image forming parts of the apparatus shorten occurs.

Because of these reasons, a need exists for an image forming apparatus in which the number of times of the termination processing and the subsequent start-up processing is decreased to increase the print speed and to prolong the lives of the image forming parts of the apparatus.

SUMMARY OF THE INVENTION

As an aspect of the present invention, an image forming apparatus is provided which includes a controller which generates image data of a page and a print control signal including print condition information for the image data of the page and outputs the image data and the print control signal together with a print request; and an engine which drives plural print process devices to print an image on a receiving material according to the image data upon receipt of the print request, the image data and the print control signal from the controller.

The engine includes:

an initiating device configured to initiate the print process devices according to the print request;

a print performing device configured to perform the print processing using the print process devices;

a print process termination device configured to terminate the initiated print process devices;

an inquiry device configured to inquire the controller whether there is a next page image to be printed when a next page print request is not received within a predetermined waiting time; and a print process controller configured to set a predetermined second waiting time when receiving a response from the controller such that there are next page image data while stopping termination of the print process devices, which is to be performed by the print process termination device, for the predetermined second waiting time to await the print request for the next page image.

As another aspect of the present invention, an image formation controlling method is provided. The image formation controlling method controls image formation of an image forming apparatus, which includes a controller generating image data of a page and a print control signal including print condition information for the image data of the page and outputting the image data and the print control signal together with a print request; and an engine driving plural print process devices to print an image on a receiving material according to the image data upon receipt of the print request, the image data and the print control signal from the controller. The image formation controlling method includes:

initiating the print process devices of the engine upon receipt of the print request together with the image data and the print control signal from the controller;

performing the print processing using the print process devices upon receipt of the print request, the image data and the print control signal;

terminating the initiated print process devices;

inquiring the controller whether there is a next page image to be printed when the engine does not receive the print request for the next page image within a predetermined waiting time; and performing print process controlling by setting a predetermined second waiting time upon receipt of a response from the controller such that there are next page image data while stopping termination of the print process devices of the engine for the predetermined second waiting time to await the print request for the next page image.

As yet another aspect of the present invention, a computer readable medium storing computer instructions for performing the above-mentioned image formation controlling method is provided.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Hereinafter, an example of the image forming apparatus of the present invention will be explained by reference to drawings. However, the example is provided for the purpose of illustration only and is not intended to be limiting. In addition, all the elements explained later are not necessarily the essential elements of the present invention.

Example 1

Figure 1:
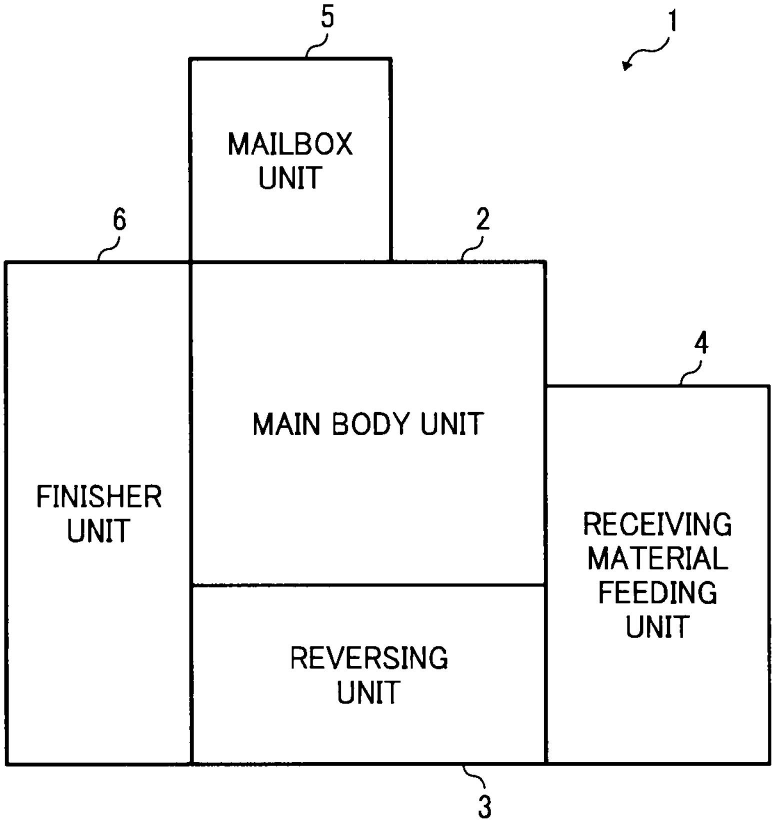
FIG. 1 is a schematic view illustrating units of an image forming apparatus (laser printer) according to an embodiment of the present invention.

FIG. 1 is a schematic view illustrating the units of an image forming apparatus (i.e., a laser printer), to which an example of the image forming apparatus, image formation controlling method, and computer readable medium storing instructions for performing the image formation controlling method is applied.

Referring to FIG. 1, a laser printer 1 includes a main body unit 2, a reversing unit 3 for reversing a receiving material sheet to perform double-side printing, a receiving material feeding unit 4, a mailbox unit 5, and a finisher unit 6. In addition, the laser printer 1 includes an operation panel 7 (as illustrated in FIG. 3). The structures of the main body unit 2, the reversing unit 3, and the mailbox unit 5 are illustrated in FIG. 2.

Figure 2:
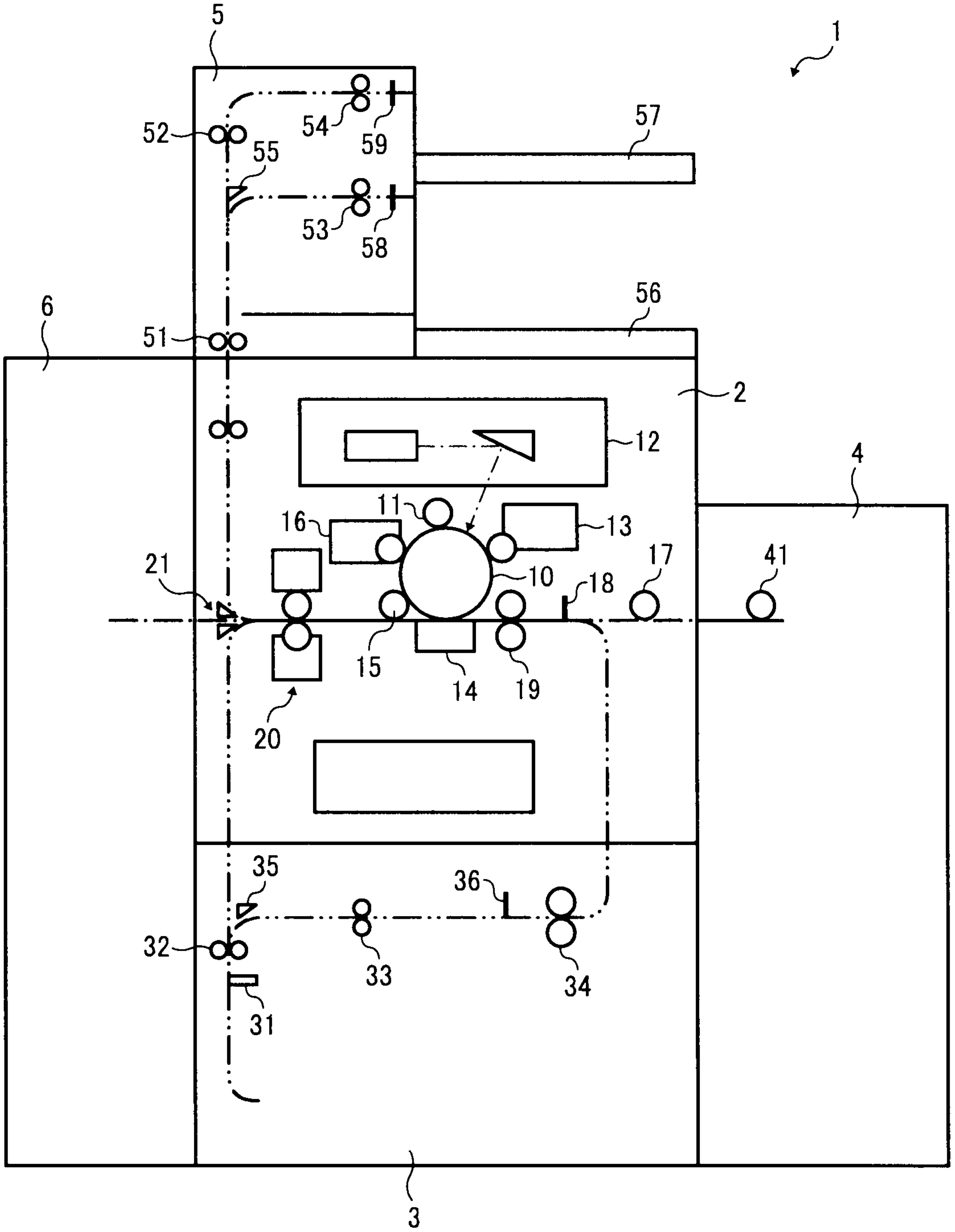
FIG. 2 is a schematic view illustrating the main portions of the laser printer illustrated in FIG. 1.
Figure 3:
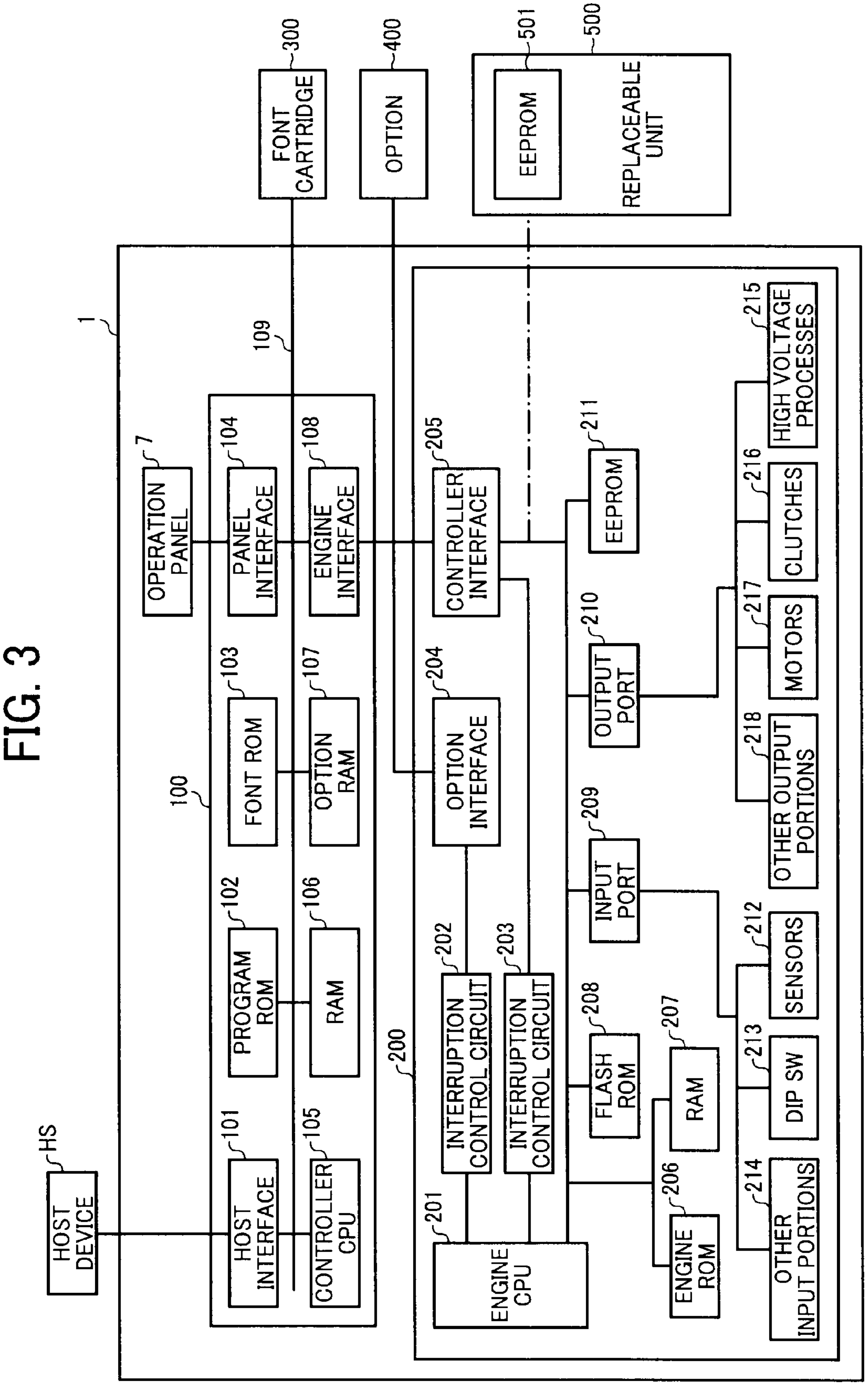
FIG. 3 is a block diagram of the laser printer illustrated in FIG. 1.

Referring to FIG. 2, the main body unit 2 includes plural print process devices such as a photoreceptor 10, and a charger 11, an optical writing device 12, a developing device 13, a transferring device 14, a separator 15, and a cleaner 16, which are clockwise arranged around the photoreceptor 10. In addition, the main body unit 2 has a feeding roller 17, a registration sensor 18, a pair of registration rollers 19, a fixing device 20 and a switching pick 21, which are arranged in this order on a receiving material feeding path indicated by a chain line in FIG. 2.

The optical writing device 12 includes a light source configured to emit a laser beam modulated according to print data received from a host device HS (illustrated in FIG. 3), a polygon mirror, which is driven at an angular velocity determined on the basis of the pixel density of the image to be formed on the photoreceptor 10 and which is configured to deflect/reflect the laser beam, which is emitted by the light source, in a main scanning direction, a group of mirrors configured to irradiate the photoreceptor 10 with the laser beam reflected by the polygon mirror, etc.

The reversing unit 3 receives a sheet of a receiving material, which bears an image on one side thereof and which is fed by the switching pick 21 toward the reversing unit. The reversing unit 3 detects the receiving material sheet using an entrance sensor 31, and then reverses the sheet using pairs of reversing rollers 32, 33 and 34, and a separation pick 35. In addition, the reversing unit 3 feeds the receiving material sheet toward the pair of registration rollers 19 while detecting the sheet using an exit sensor 36.

The receiving material feeding unit 4 includes plural receiving material trays (not shown), a feeding mechanism (not shown) configured to feed the receiving material sheets in the trays one by one, and a feeding roller 41 configured to feed the sheet to the main body unit 2. The receiving material trays can contain plural sheets of respective receiving materials, which may be different in size, composition (such as papers and films) and setting direction (such as portrait orientation and landscape orientation).

In the main body unit 2, the receiving material sheet fed from the receiving material feeding unit 4 is fed by the feeding roller 17 to the pair of registration rollers 19. After the receiving material sheet is detected by the registration sensor 18 to be subjected to positional adjustment with respect to a toner image, which is formed on the photoreceptor 10 and which is to be transferred to the sheet, the sheet is timely fed by the pair of registration rollers 19 toward a nip formed by the photoreceptor 10 and the transferring device 14. In the main body unit 2, the photoreceptor 10 and other members such as the rollers 17 and 19 are driven by one or more motors (not shown). The charger 11 uniformly charges the surface of the photoreceptor 10, and the optical writing device 12 irradiates the charged surface of the photoreceptor 10 with the laser beam modulated according to the image data to form an electrostatic latent image on the photoreceptor 10. The developing device 13 develops the electrostatic latent image with a developer including a toner to form a toner image on the photoreceptor 10.

The transfer device 14 transfers the toner image formed on the photoreceptor 10 onto the receiving material sheet, which has been fed by the feeding roller 41 or the reversing unit 3 and which is fed to the transfer nip by the pair of registration rollers 19 after the positional (timing) adjustment mentioned above. The receiving material sheet, onto which the toner image is transferred, is separated from the photoreceptor 10 due to a separation voltage applied by the separator 15. The receiving material sheet bearing the toner image thereon is fed to the fixing device 20. The fixing device 20 fixes the toner image onto the receiving material sheet upon application of heat and pressure thereto. The receiving material sheet bearing the fixed toner image thereon is then fed to the mailbox unit 5, the finisher unit 6 or the reversing unit 3 by properly switching the switching pick 21.

The mailbox unit 5 includes plural feeding rollers 51-54, a discharge switching pick 55, two discharge trays 56 and 57, discharge sensors 58 and 59 configured to detect discharging of the printed receiving material sheets to the discharge trays 56 and 57. When a printed receiving material sheet is fed to the mailbox unit 5, the feeding rollers 51-54 discharge the printed receiving material sheet to the discharge tray 56 or 57 after properly switching the discharge switching pick 55.

The finisher unit 6 subjects the printed receiving material sheets to a treatment such as stapling treatment and folding treatment.

As illustrated in FIG. 3, the main body unit 2 of the laser printer 1 is broadly classified into a controller 100, an engine 200 and the operation panel 7. A font cartridge 300, which can be used when a font is added, is connected with the controller 100. In addition, an option 400 such as scanner units and facsimile units is added to the engine 200, and a replaceable unit 500 of the engine 200 is provided.

The controller 100 includes a host interface 101, a program ROM (Read Only Memory) 102, a font ROM 103, a panel interface 104, a controller CPU (Central Processing Unit) 105, a RAM (Random Access Memory) 106, an option RAM 107 and an engine interface 108, which are connected with each other through a bus 109.

The host interface 101 is connected with the host device HS so as to receive control signals and data sent to the laser printer 1 from the host device HS and to send data and signals such as status signals to the host device HS from the laser printer 1.

The program ROM 102 stores various programs used for data processing or data management in the controller 100 and for controlling peripheral modules (such as option 400). Specifically, the programs include a basic process program for the laser printer 1, and image formation control process program for executing the image formation controlling method mentioned below. In addition, the program ROM 102 also stores various data needed for executing these programs.

The font ROM 103 stores various types of fonts used for printing images in the laser printer 1. The fonts are read out by the controller CPU 105 to be used for the printing process of the printer 1. By connecting the font cartridge 300 with the printer 1, the printer can use additional fonts.

The panel interface 104 is connected with the operation panel 7, which includes operation keys for use in changing the mode and font of the laser printer 1 and a display (such as liquid crystal displays) configured to indicate the status of the printer. The panel interface 104 performs signal sending/receiving between the controller 100 and the operation panel 7.

The controller CPU 105 processes the data (print data and control data) sent from the host device HS using the programs stored in the program ROM 102 while using the RAM 106 as a work memory to control the parts of the laser printer (particularly the engine 200) so that the parts can perform the print output processing (i.e., image formation processing). In addition, the controller CPU 105 performs image formation controlling processing for controlling the operations of the engine 200 while considering the data processing time in the controller 100 as mentioned below.

The RAM (i.e., page memory) 106 is used as a work memory of the controller CPU 105 while used as a bitmap memory in which the print data sent from the host device HS and temporarily stored in a buffer per each page are converted to a real image pattern (i.e., print pattern) according to the print condition information sent from the host device HS together with the print data.

The option RAM 107 is an auxiliary memory, and is secondarily used when the capacity of the RAM 106 is insufficient to perform a processing.

The controller 100 may include a NVRAM (Nonvolatile Random Access Memory), which can hold the data stored therein even when the laser printer 1 is turned off.

The engine interface 108 is connected with the engine 200, and performs sending/receiving of control signals and print request including image data, which are output from the controller 100 to the engine 200, and status signals and various requests sent from the engine to the controller.

The engine 200 is the generic name of a portion including the image forming section of the main body unit (which section includes the print process devices of from the photoreceptor 10 to the cleaner 16 and fixing device 20), the reversing unit 3, the receiving material feeding unit 4, the mailbox unit 5, and the finisher unit 6. The engine 200 includes an engine CPU 201, two interruption control circuits 202 and 203, an option interface 204, a controller interface 205, an engine ROM 206, a RAM 207, a flash ROM 208, an input port 209, an output port 210, an EEPROM (Electrically Erasable and Programmable ROM) 211, sensors 212 connected with the input port, a dip switch 213, other input portions 214, high voltage processes 215 connected with the output port 210, clutches 216, motors 217 and other output portions 218.

The controller interface 205 is connected with the engine interface 108 of the controller 100 and performs sending/receiving of image data, control signals and print requests. The controller interface 205 is directly connected with the engine CPU 201 with a bus while connected with the engine CPU 201 through the interruption control circuit 203 to directly send various signals and request, which are output from the controller 100, to the engine CPU 201 through the bus and to output signals and requests, which are output from the engine CPU 201 through the interruption control circuit 203, to the controller 100.

The option interface 204 is connected with the option 400 while connected with the engine CPU 201 through the interruption control circuit 202 to perform processings needed for controlling usage of the option 400 (such as start and termination of usage of the option) between the option interface and the engine CPU through the interruption control circuit 202.

The input port 209 converts analogue signals sent from the sensors 212, the dip switch 213, and the other input portions 214 to digital signals and outputs the digital signals to the engine CPU 201. The output port 210 outputs the various signals sent from the engine CPU 201 to the high voltage processes 215, the clutches 216, the motors 217 and the other output portions 218.

The flash ROM 208 stores programs such as basic control process program of the engine 200 of the laser printer 1 and image formation control process program for executing the image formation controlling method mentioned below while storing various data (particularly, data used for the image formation control processing) used for executing the programs.

The engine CPU 201 performs print processing (i.e., image formation processing) using the programs stored in the flash ROM 208 while using the RAM 207 as a work memory and controlling each portion of the engine 200, and performs image formation control processing on the basis of the image formation control process program. The engine CPU 201 serves as an initiating device configured to initiate the print process devices (at least, the devices of from the charger 11 to the cleaner 16) according to the print request; a print performing device configured to perform the print processing using the print process devices; a print process termination device configured to terminate the initiated print process devices; an inquiry device configured to inquire the controller 100 whether there is a next page image to be printed when a next page print request is not received within a predetermined waiting time; and a print process controller configured to set a predetermined second waiting time when receiving a response from the controller such that there are next page image data, while stopping termination of the print process devices by the print process termination device for the predetermined second waiting time to await the next print request.

When the laser printer 1 receives data from the host device HS through the host interface 101, the controller CPU 105 analyzes the data according to the data analysis program stored in the program ROM 102 to separate the print data and print control data (SP, CR, LF, HT, VT, etc.) from other data. The controller CPU 105 once stores the print data and print control data in a receive buffer in the RAM 106, and performs a processing on each of the received data while reading out the data one by one according to the control program stored in the program ROM 102. For example, the controller CPU 105 receives print condition information such as line density, print size, character code, font of the image to be printed and the kind (such as size, composition and setting direction) of receiving material, and prepares image data, which can be used for the engine 300, on the basis of the print condition information. Thus, the controller CPU 105 obtains a print request and print control information such as the print condition information.

Thus, when the controller CPU 105 receives a print order and information necessary for printing from the host device HS through the engine interface 108, the controller CPU prepares image data according to the information and processes the image data so as to be expanded in the RAM 106. When the controller CPU 105 has converted a predetermined amount of data (for example, data for one page) to image data, the controller CPU 105 outputs a print request to the controller interface 206 of the engine 200 through the engine interface 108 and transfers the image data to the engine 200 in synchronization with the print request. Since the engine CPU 201 controls the series of print processings as mentioned above, the engine 200 prints an image on a receiving material sheet according to the print data for the image sent from the host device HS.

The EEPROM 211 is a memory similar to an EEPROM 501, which is attached to the replaceable unit 500, and stores therein various kinds of information on the replaceable unit 500 (such as type, life and model number of the replaceable unit) necessary for maintenance of the replaceable unit.

The laser printer 1 can read out image formation control program, which executes the image formation controlling method of the present invention and which is stored in a computer readable recording medium such as ROMs, EEPROMs, EPROMs, flash memories, flexible discs, CD-ROMs (Compact Disc Read Only Memory), CD-RWs (Compact Disc Rewritable), DVDs (Digital Video Disk), SD (Secure Digital) cards, and MOs (Magneto-Optical Disc), and incorporates the program in the program ROM 102 of the controller 100, the engine ROM 206 of the engine 200 or a hard disc (not shown) to perform the image formation controlling method which is explained later and by which print data for plural pages can be efficiently processed at a high speed. The image formation control program is a computer executable program described with a legacy programming language or object-oriented programming language such as assembler, C, C++, C#, and JAVA™. The program is stored in the above-mentioned recording media to be distributed.

Next, the operations of the laser printer 1 will be explained. The laser printer 1 can efficiently controls the inter-page print processing in a plural-page print processing.

In the case of a conventional laser printer, when the laser printer 1 performs a plural-page print processing, the engine CPU 201 transfers the portions (devices) of the engine 200 (for example, print process devices of from the charger 11 to the cleaner 16) from the initiated state to the terminated state when a next page print request is not received within a predetermined waiting time after receiving the print request for the present page printing. Upon receipt of the next page print request, the printer starts the start-up processing (initiation processing) to print the next page image.

Figure 4:
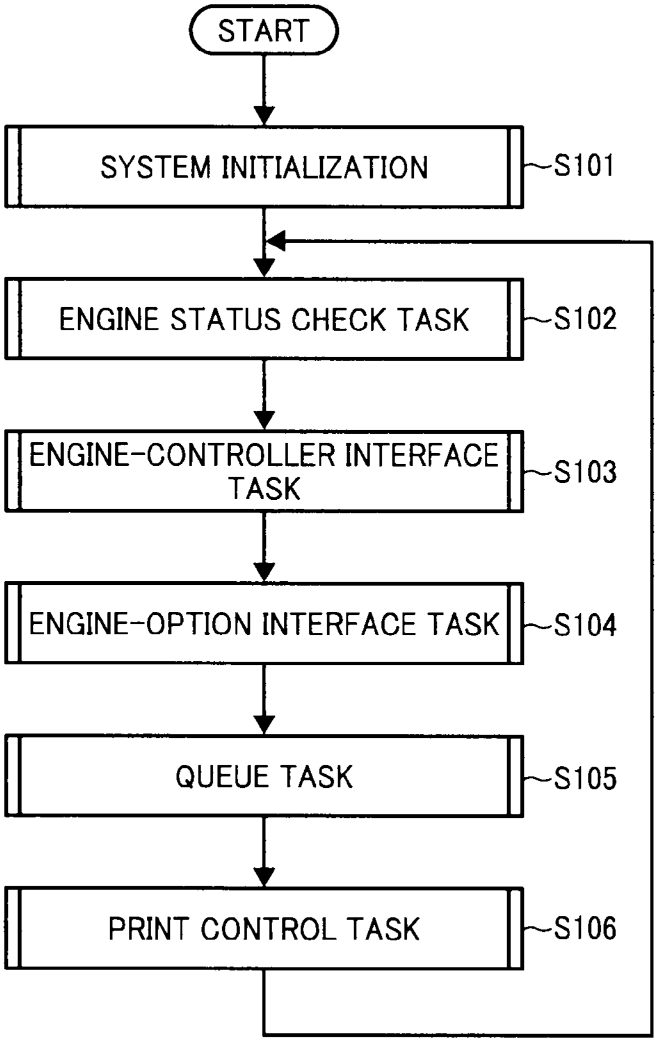
FIG. 4 is a flowchart of the image formation control processing of the laser printer illustrated in FIG. 1.

Specifically, when a power is supplied to the laser printer 1, the initial start-up processing of the printer 1 is performed. More specifically, as illustrated in FIG. 4, when a power is supplied, the controller CPU 105 and the engine CPU 201 perform a predetermined system initialization processing in step S101, followed by an engine status check task of checking whether there is a maintenance request of the controller and engine themselves and whether errors occur in the controller and engine (step S102).

Next, the controller CPU 105 and the engine CPU 201 perform an engine-controller interface task of performing interface controlling between the engine 200 and the controller 100 (such as receipt of an order to feed a receiving material sheet, a request for setting the resolution of images, and a request for switching the entrance from which a receiving material sheet is fed or the exit from which a copy sheet is discharged) in step S103. Next, the engine CPU 201 performs an engine-option interface task of performing interface control for the sequence of the processing performed in the option 400 (such as receiving material sheet feed timing and on/off of a high voltage process (power supply)) in step S104.

When the control task for each interface is completed, the laser printer 1 then checks whether there is a print job from the host device HS. When the controller 100 receives a print job through the host interface 101, the controller CPU 105 determines whether the print job or other jobs should be performed at first. When it is determined that the print job should be performed at first, the controller CPU 105 performs a queue task such that the image data of one page are expanded in the RAM 106, and then the data are sent to the engine 200 as a print request together with a necessary print control signal (step S105).

Figure 5:
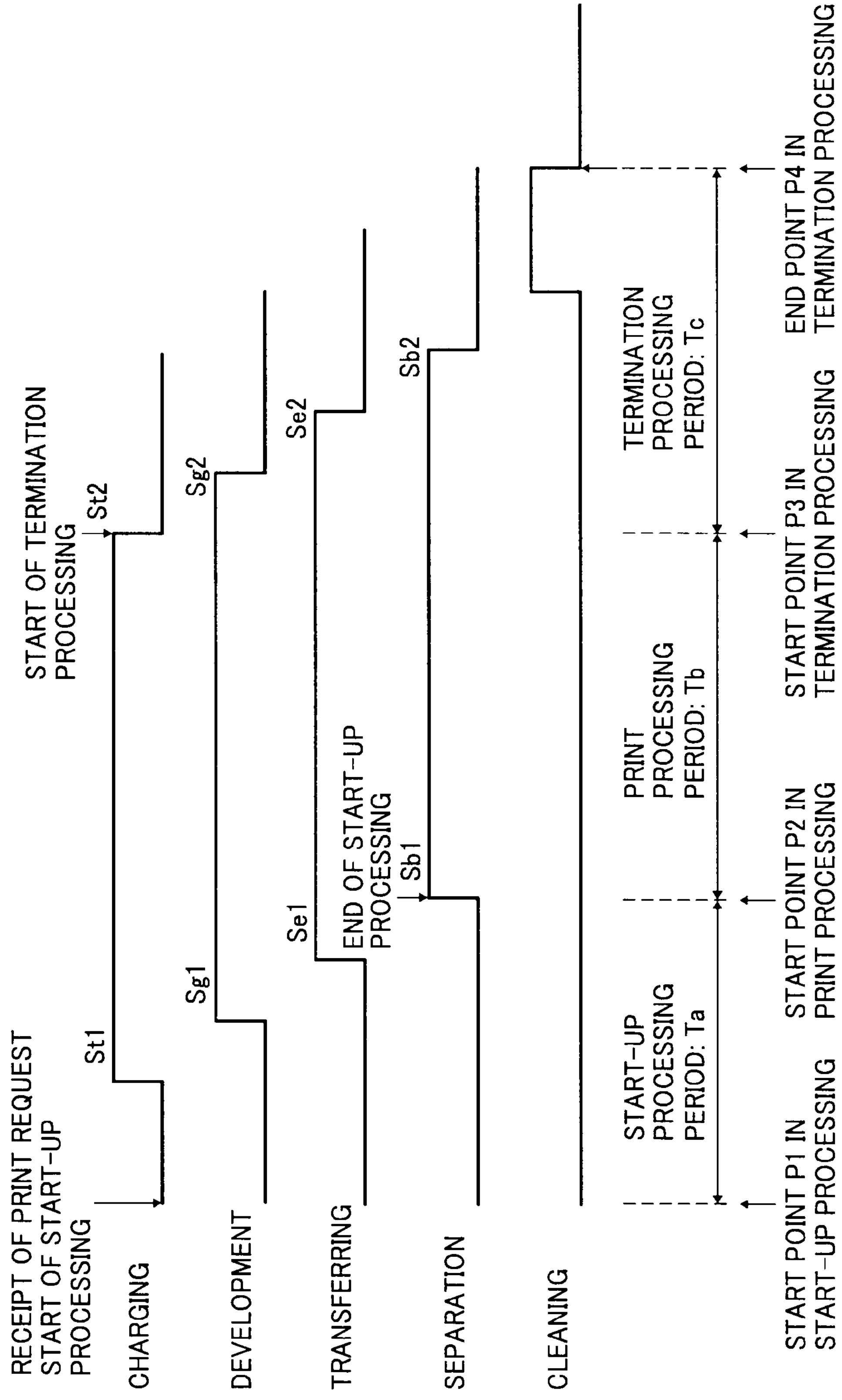
FIG. 5 BACKGROUND ART
FIG. 5 is a timing chart in a one-page image formation processing of a background laser printer.

When the engine CPU 201 receives a print request from the controller 100, the engine CPU 201 performs a series of print processings (i.e., print control task) as illustrated in FIG. 5 in step S106. Specifically, when the engine CPU 201 receives a print request from the controller CPU 105, the engine CPU 201 performs timing adjustment for the portions of the engine 200 (particularly, devices of from the charger 11 to the cleaner 16), supply of a high voltage, and the like tasks. Thus, the laser printer 1 completes the one-cycle of tasks (i.e., from job of fulfilling a one-page print request to job of fulfilling any request (such as next page request) made in the subsequent predetermined waiting time). After the print control task is completed, the laser printer 1 returns to step S102 (engine status check task) to perform the tasks (i.e., tasks of from step S102 to step S106) in the same manner as mentioned above.

The image formation control processing of the laser printer 1 includes not only the main sequence mentioned above, but also time monitoring for each processing and performance of interruption processings performed by the interruption control circuits 202 and 203 such that an interruption processing is performed in the sequence control, which are performed independently from the main sequence.

In the print control task mentioned above, the engine CPU 201 controls the various portions of the engine 200 (e.g., print process devices of from charger 11 to the cleaner 16 of the main body unit 2), the receiving material sheet feeding unit 4, the reversing unit 3, the mailbox unit 5 and the finisher unit 6 during the states thereof from the start-up state to the termination state.

FIG. 5 is a timing chart in a one-page image formation processing of a background laser printer.

As illustrated in FIG. 5, when the engine CPU 201 receives a print request from the controller CPU 105 through the engine interface 108 and the controller interface 205, the engine CPU 201 starts to perform the start-up processing at a start point P1 of the start-up processing. In the start-up processing, at first the receiving material feeding unit 4 is controlled to feed a receiving material sheet. After a predetermined time passes, the engine CPU 201 starts to perform a start-up processing on the charger 11 (St1 in FIG. 5). In addition, at a predetermined time after the start-up processing of the charger (i.e., at a time when the charger is considered to start up), the engine CPU 201 starts to perform a start-up processing on the developing device 13 (Sg1 in FIG. 5). Further, at a predetermined time after the start-up processing of the developing device 13, the engine CPU 201 starts to perform a start-up processing on the transferring device 14 (Se1 in FIG. 5). Furthermore, at a predetermined time after the start-up processing of the transferring device 14, the engine CPU 201 starts to perform a start-up processing on the separator 15 (Sb1 in FIG. 5). In this regard, the time when the start-up processing of the separator 15 is completed is referred to as a start point P2 of the print processing, and the period between the start point P1 of the start-up processing and the start point P2 of the print processing is referred to as a start-up processing period Pa.

When the start-up processing is completed (i.e., when the start-up processing period Pa ends), the engine CPU 201 controls the print process devices 11-16 of the engine to perform a series of process print processings including a charge processing in which the charger 11 uniformly charges the photoreceptor 10; a light irradiation processing in which the optical writing device 12 irradiates the charged photoreceptor with laser light modulated according to the image data sent from the controller CPU 105 to form an electrostatic latent image on the photoreceptor; a development processing in which the developing device 13 develops the electrostatic latent image with a developer including a toner to form a toner image on the photoreceptor; a transfer processing in which the transferring device 14 transfers the toner image onto a receiving material sheet by applying a transfer voltage thereto; and a separation processing in which the separator 15 separates the receiving material sheet bearing the toner image thereon from the photoreceptor.

In this regard, in conventional methods, the engine CPU checks whether or not a next print request is sent from the controller CPU 105 in the predetermined waiting time starting from the last print request for printing the image of the present page. If there is no next print request, the engine CPU 201 allows the charger 11 to starts to terminate at a start point P3 of the termination processing (i.e., a point St2 in FIG. 5), followed by termination processings of the developing device 13 (Sg2 in FIG. 5), the transferring device 14 (Se2 in FIG. 5), and the separator 15 (Sb2 in FIG. 5), which are performed with predetermined intervals therebetween. In addition, at a time when the portion of the photoreceptor, which has borne the toner image thereon before the transfer process, enters into the cleaner 16, the cleaner 16 is operated as illustrated in FIG. 5. The time when the cleaning operation is completed is referred to as an end point P4 of the termination processing. Thus, the series of print processings terminate. In this termination processing, the devices (high voltage processes) of the charger 11, developing device 13, the transferring device 14 and the separator 15 are terminated in this order. In addition, the cleaner 16 performs a cleaning process of decaying charges remaining in the photoreceptor 10, resulting in completion of the termination processing. As illustrated in FIG. 5, the period between the start point P1 of the start-up processing and the start point P2 of the printing processing is referred to as a start-up processing period Ta, the period between the start point P2 and the start point P3 of the termination processing is referred to as a print processing period Tb, and the period between the start point P3 and the endpoint P4 of the termination processing is referred to as a termination processing period Tc.

Figure 6:
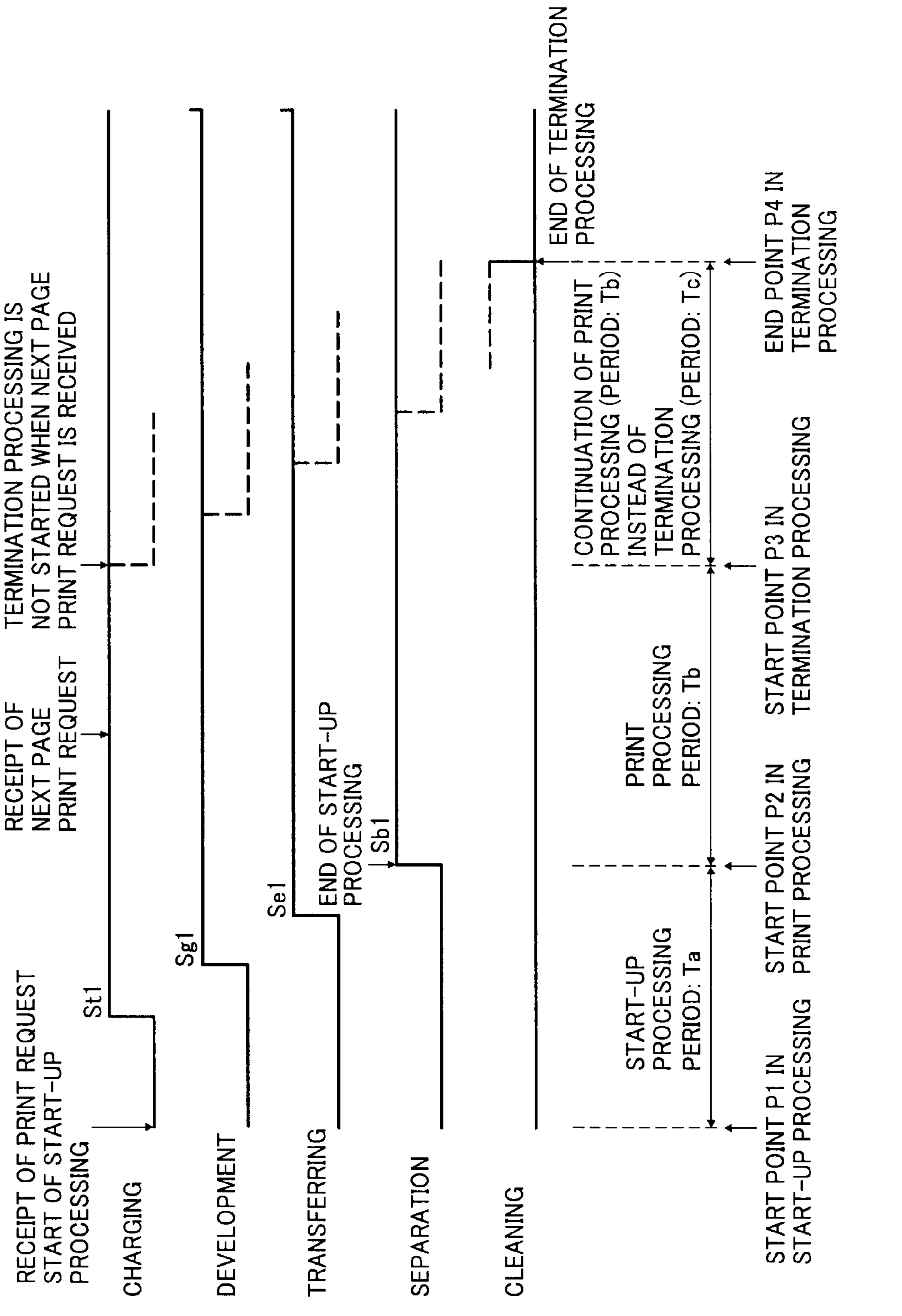
FIG. 6 BACKGROUND ART
FIG. 6 is a timing chart in a continuous plural-page image formation processing of the background laser printer.

In such conventional methods, when no next print request is sent from the controller CPU 105 before the start point P3 of the termination processing after the series of print processings are performed, the engine CPU 201 performs the termination processing in which the print process devices of the photoreceptor 10 and devices of from the charger 11 to the cleaner 16 are terminated for the purpose of failsafe. When a next print request is received from the controller CPU 105 in a period between the start point P2 of the print processing and the start point P3 of the termination processing as illustrated in FIG. 6, the termination processings of the print process devices of from the photoreceptor 10 to the cleaner 16 are not performed at the start point P3 of the termination processing, and the next page print processing is started at the start point P2, which corresponds to the start point P3 of the termination processing for the former page image formation. If another print request is received until the start point P3 of the termination processing for the second page image formation, the print processing is repeated in the same manner.

The end of the waiting time, which is the time of from receipt of a first print request to receipt of a next print request, is the start point P3 of the termination processing changes depending on the mechanical properties and printing conditions of the laser printer 1. Therefore, it is preferable that the information on the waiting time is stored, for example, in a nonvolatile memory so that the engine CPU 201 can manage the information, and the users can change the waiting time by using the operation panel 7 or the like.

Figure 7:
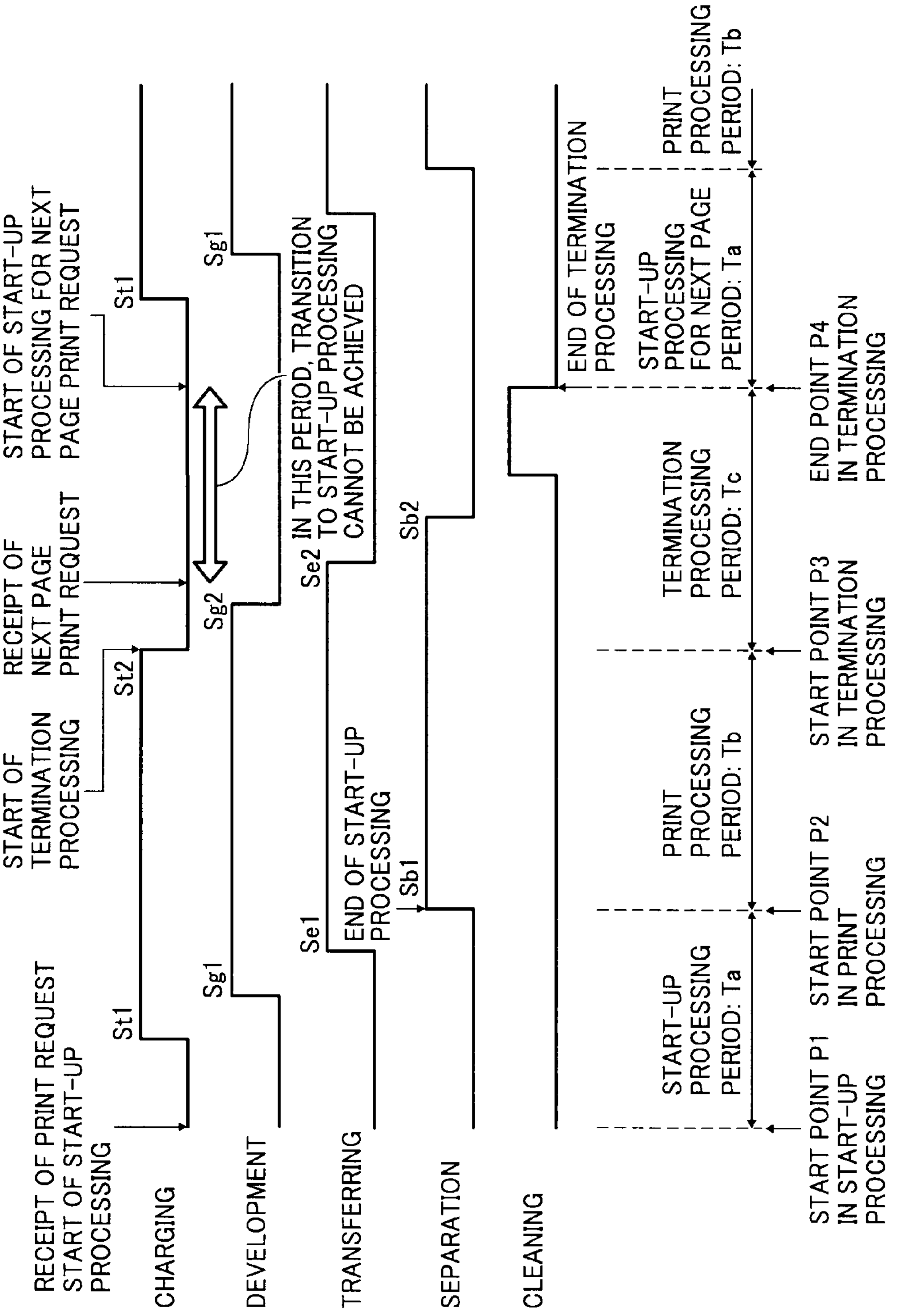
FIG. 7 BACKGROUND ART
FIG. 7 is a timing chart in a discontinuous plural-page image formation processing of the background laser printer.

In general, image data for a print job are image data for plural pages. In this regard, there is a case where a next print request of from the controller CPU 105 to the engine 200 is not received until the start point P3 of the termination processing as illustrated in FIG. 7 due to delay in expanding the image data in the RAM 106 of the controller 100 for the reason such that the images have different pixel densities. In such a case, it is necessary for conventional image forming apparatus to perform again the start-up processing because the termination processing of the print process devices of from the photoreceptor 10 to the cleaner 16 has been started. In this case, as illustrated in FIG. 7, the start-up processing has to be started for the print process devices of from the photoreceptor 10 to the cleaner 16 after the termination processing of the print process devices is completed and then the cleaning process is performed by the cleaner 16 (i.e., after the end point P4 of the termination processing (i.e., after the end of the termination processing period Tc). In other words, if the engine 200 starts the termination processing for the print process devices of from the photoreceptor 10 to the cleaner 16, the start-up processing for the next page image cannot be started until the termination processing is completed for all the devices. Therefore, the period (indicated by an outline arrow having two heads in FIG. 7) between receipt of the next print request to the end point P4 of the termination processing (i.e., the start point of the start-up processing for the next page image) is useless. In addition, the number of times of the start-up processing and the termination processing increases, thereby accelerating deterioration of the print process devices of from the photoreceptor 10 to the cleaner 16, resulting in shortening of the life of the laser printer 1.

Figure 8:
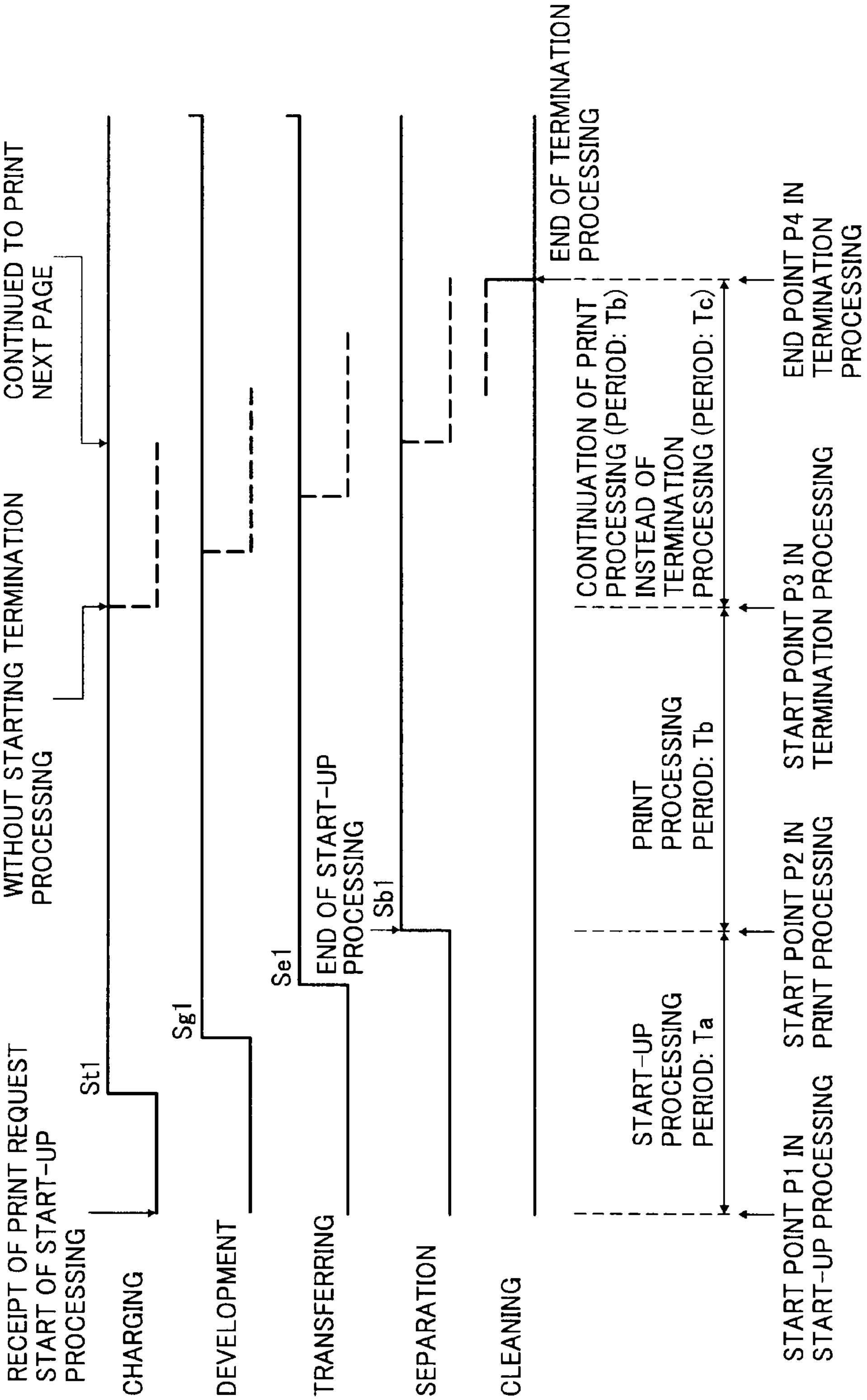
FIG. 8 is a timing chart in an image formation processing of the laser printer illustrated in FIG. 1.

In contrast, the laser printer of the present invention performs the print processing as illustrated in FIG. 8. Specifically, when a next print request is not received from the controller CPU 105 of the controller 100 until the start point P3 of the termination processing, the engine CPU 201 performs an interruption processing of asking the controller 100 whether there are image data for the next page through the interruption control circuit 203 and the controller interface 205.

Figure 9:
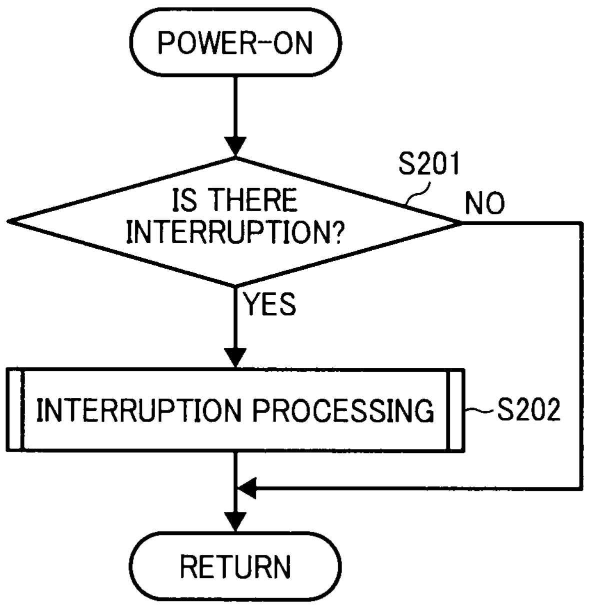
FIG. 9 is a flowchart of the interruption control processing in the image formation processing illustrated in FIG. 8.

Specifically, as illustrated in FIG. 9, when the power for the laser printer 1 is on, the engine CPU 201 checks whether it is a time for an interruption processing (step S201). If it is not a time for an interruption processing (NO in step S201), the processing is continued without performing the interruption processing.

In step S202, the engine CPU 201 performs the interruption processing (e.g., interruption processing of inquiring for print of the next page) at a predetermined interruption timing, for example, at the termination processing start point P3 (i.e., at the end of the predetermined waiting time starting from receipt of the print request for the present page). Specifically, the interruption processing of the engine CPU 201 is such that the engine CPU asks the controller CPU 105 of the controller 100 whether there is a next page to be printed.

Upon receipt of inquiry about print of the next page from the engine CPU 201, the controller CPU 105 judges whether there is a next page image to be printed from the print job that the controller CPU manages, and answers the engine CPU whether there is a next page image to be printed. Specifically, even when the controller CPU 105 does not send a next page print request to the engine CPU 201, the controller CPU knows whether there is a next page image to be printed. Therefore, when receiving inquiry about print of the next page image from the engine CPU 201, the controller CPU 105 judges whether there is a next page image to be printed from the print job that the controller CPU manages, and answers the engine CPU whether there is a next page image to be printed.

When the engine CPU 201 receives a response from the controller CPU 105 such that there is no next page image to be printed, the engine CPU starts to perform the above-mentioned print process termination processing.

The engine CPU 201 receives a response from the controller CPU 105 such that there is a next page image to be printed, the engine CPU does not start the print process termination processing in a predetermined second waiting time starting from the termination processing start point P3, in which the interruption processing of inquiring about next page printing occurs, to await the next print request. Specifically, the engine CPU 201 waits the next page print request while maintaining the high voltage applied to the print process devices of from the photoreceptor 10 to the cleaner 16 (particularly, from the charger 11 to the separator 15). If the engine CPU 201 does not receive the next page print request from the controller CPU 105 within the second waiting time, the engine CPU starts to perform the print process termination processing for the purpose of failsafe.

When the engine CPU 201 receives the next page print request from the controller CPU 105 within the second waiting time, the print processing for the next page is performed (i.e., transition to the print processing period Tb is made) without performing another action because the termination processing is not yet performed and therefore the print process devices are still in a working state.

When the engine CPU 201 does not receive a next page (i.e., third page) print request until the end of the termination process start point P3 for the second page even after the engine CPU 201 performs the print processing for the second page, the engine CPU performs again the interruption processing of inquiring about the third page printing.

Thus, in the laser printer 1 of Example 1, the controller 100 generates image data for each page, and a print control signal including print condition information on the image data, and outputs the image data and the print control signal to the engine 200 together with a print request. Upon receipt of the print request from the controller 100, the engine 200 drives plural print process devices such as the photoreceptor 10, and the devices of from charger 11 to cleaner 16, the main body unit 2, the receiving material feeding unit 4, the reversing unit 3, and mailbox unit 5 to print an image on a receiving material sheet according to the image data. Specifically, upon receipt of the print request, the devices (at least the devices of from charger 11 to cleaner 1&) of the print process devices are initiated to print an image on a receiving material sheet using the initiated devices. When the engine 200 does not receive a next page print request in a predetermined waiting time starting from receipt of the present page print request, the engine asks the controller 100 whether there is a next page image to be printed. When the engine 200 receives a response from the controller 100 such that there is a next page image to be printed, the engine awaits the next page print request from the controller 100 without starting the termination processing for the devices 10-16.

Therefore, even in a case where a next page print request is not received within a predetermined waiting time due to delay in expanding the image data in the controller 100 for the reason that the images have different pixel densities or other reasons, the next page print request is awaited without performing the termination processing on the print process devices of from the photoreceptor 10 to the cleaner 16 if it is confirmed that there are next page image data. Therefore, the number of times of the print process termination processing and the print process start-up processing can be decreased, resulting in increase of the processing speed and extension of the life of the print process devices such as devices 10-16.

In the case where the engine CPU 201 receives a response from the controller CPU 105 such that there is a next page image to be printed, the laser printer 1 may set the second waiting time by the following method. Specifically, upon receipt of a response such that there is a next page image to be printed, at first the engine CPU 201 asks the controller 100 by when the next page data are expanded in the controller. Next, the engine CPU 201 sets the second waiting time on the basis of the ending time of the next page expansion (hereinafter referred to as next page data expansion ending time) estimated by the controller 100.

More specifically, when the engine CPU 201 receives a response to the inquiry concerning the next page image from the controller CPU 105 such that there is a next page image to be printed, the engine CPU requests the controller CPU 105 to obtain information on the next page expansion ending time, by which the image data for the next page can be expanded in the page memory (i.e., the RAM 106). The controller CPU 105 estimates the next page expansion ending time on the basis of the information on the next page image such as amount of data and resolution of the next page image, and informs the engine CPU 201 of the estimated next page expansion ending time.

Upon receipt of the estimated next page expansion ending time from the controller CPU 105, the engine CPU 201 determines the second waiting time for the next page print request on the basis of the estimated next page expansion ending time. Next, upon receipt of the next page print request from the controller CPU 105, the engine CPU 201 performs the print processing. If there is no print request within the second waiting time, the engine CPU 201 performs the process termination processing.

By using this method, the second waiting time can be properly set depending on the data processing time needed for processing the next page data in the controller 105. Therefore, the second waiting time can be properly set without wastefully increasing the second waiting time while securing failsafe for the engine 200. Therefore, the processing time can be shortened, and thereby the availability of the laser printer 1 can be enhanced and in addition the power consumption of the printer can be reduced.

This method can be modified such that the controller CPU 105 estimates the next page print request sending time on the basis of the next page expansion ending time estimated thereby, and then informs the engine CPU 201 of the next page print request sending time. The engine CPU 201 determines the second waiting time on the basis of the next page print request sending time. By using this modified method, the load on the engine CPU 201 can be reduced.

In addition, the laser printer 1 of Example 1 may use the following image formation controlling method. Specifically, in the case where the engine CPU 201 receives a response from the controller CPU 105 such that there is a next page image to be printed, the engine CPU 201 requests the controller CPU 105 to obtain information on the pixel density of the next page image as the next page print condition information. In this regard, when the pixel density of the next page image is different from that of the present (former) page image, the engine CPU 201 determines whether the print processing should be continued to print the next image or the print process termination processing should be performed for the purpose of failsafe.

More specifically, when receiving a response from the controller CPU 105 such that there is a next page image to be printed, the engine CPU 201 requests the controller CPU 105 to obtain information on the pixel density of the next page image. In response to the request, the controller CPU 105 sends the information on the pixel density of the next page image to the engine CPU 201.

Upon receipt of the information on the pixel density of the next page image from the controller CPU 105, the engine CPU 201 determines whether the print processing should be continued to print the next page image or the print process termination processing should be performed. Namely, when the pixel density of the next page image is the same as that of the present page image, the engine CPU 201 determines that it is not necessary to change the conditions of the print process devices of from photoreceptor 10 to the cleaner 16, and awaits a next page print request for the above-mentioned second waiting time. When receiving a next page print request from the controller CPU 105 within the second waiting time, the engine CPU 201 makes transition to the print processing period Tb, in which the print processing is performed at the print request. If the engine CPU 201 does not receive a next page print request, the engine CPU starts to perform the print process termination processing for the purpose of failsafe. When the pixel density of the next page image is different from that of the present page image and therefore it is necessary to stop the rotation of the polygon mirror of the optical writing unit, followed by rotating the polygon mirror under different rotation conditions so as to match the pixel density of the next page image, the engine CPU 201 starts to perform the print process termination processing for the purpose of failsafe.

By using this method for the case where the pixel density of the next page image is different from that of the present page image and therefore it is necessary to perform the start-up processing again, the engine CPU 201 can relatively rapidly start the print process termination processing compared to a method in which upon receipt of a next page print request in the second waiting time, the print process termination processing is performed to change the rotation conditions of the polygon mirror, and then the start-up processing is performed again. Therefore, by using this method, it is possible to save time, and the printing process can be rapidly performed with high precision even when the printing conditions are different.

In addition, the laser printer 1 of Example 1 may use the following image formation controlling method. Specifically, when receiving a response from the controller CPU 105 such that there is a next page image to be printed, the engine CPU 201 requests the controller CPU 105 to obtain information on the kind (such as size, composition and setting direction) of the receiving material sheet, on which the next page image is to be formed, as the next page print condition information. When the kind of the receiving material sheet is different from that of the receiving material sheet on which the present page image is formed, the engine CPU 201 determines whether or not the receiving material feeding speed should be changed. Depending on the determination, the engine CPU 201 continues the print processing or starts to perform the print process termination processing.

More specifically, when receiving a response from the controller CPU 105 such that there is a next page image to be printed, the engine CPU 201 requests the controller CPU 105 to obtain information on the kind of the receiving material sheet, on which the next page image is to be formed. In response to the request, the controller CPU 105 informs the engine CPU 201 of the information on the kind of the receiving material sheet. On the basis of the information, the engine CPU 201 determines whether the print processing should be continued or the print process termination processing should be performed. Specifically, when the kind of the receiving material sheet for the next page image is the same as that of the receiving material sheet for the present page image, the engine CPU 201 judges that it is not necessary to change the conditions of the print process devices of from the photoreceptor 10 to the cleaner 16 (particularly, the conditions for receiving material sheet feeding speed), and the engine CPU 201 makes transition to a next page print request awaiting processing in which a next page print request is awaited in the above-mentioned second waiting time. When receiving a next page print request from the controller CPU 105 within the second waiting time, the engine CPU 201 makes transition to the print processing period Tb, in which the print processing is performed at the print request.

If the engine CPU 201 does not receive a next page print request, the engine CPU starts to perform the print process termination processing for the purpose of failsafe. When the kind of the receiving material for the next page image is different from that for the present page image and therefore it is necessary to change the feeding speed of the receiving material sheet, the engine CPU 201 starts to perform the print process termination processing for the purpose of failsafe. The relationship between the kind of the receiving material and the feeding speed therefor is previously stored as a table in a nonvolatile memory or the like of the engine 200. In this regard, it is possible to order the engine CPU 201 to change the relationship between the kind of the receiving material and the feeding speed therefor using the operation panel 7.

By using this method for the case where the kind of the receiving material for the next page image is different from that for the present page image and therefore it is necessary to change the feeding speed of the receiving material, the engine CPU 201 can relatively rapidly start the print process termination processing compared to a method in which upon receipt of a next page print request in the waiting time, the print process termination processing starts to be performed to change the feeding speed, and then the start-up processing is performed again. Therefore, by using this method, it is possible to save time, and the printing process can be rapidly performed with high precision even when the printing conditions are different.

In the above-explanation, a request for sending the next page data expansion ending time (or the next page print request sending time), a request for sending the next page data pixel density information, or a request for sending information on the receiving material for the next page image is made by the engine CPU 201 when the engine CPU receives a response from the controller CPU 105 such that there is a next page image to be printed. However, the method is not limited thereto, and other methods such that one or more of the above-mentioned requests are made at the same time the inquiry as to whether there is a next page image to be printed is made. By using this method, the process speed of the entire print processing can be enhanced.

In addition, in the laser printer 1 of Example 1, the engine CPU 201 may check (each portion of) the engine 200 to determine whether or not the engine is abnormal. For example, it is possible that the engine CPU 201 checks whether there is a jammed receiving material sheet in the printer 1 at a time between receipt of a print request and receipt of a next print request, and then the engine CPU determines whether the print process should be continued or the print process termination processing should be performed.

Specifically, when the engine CPU 201 receives a print request and then starts to perform the start-up processing, the engine CPU starts to check whether or not the engine 200 is abnormal. The engine CPU performs the checking at regular intervals until receipt of the next print request.

Next, the engine CPU 201 determines whether it is possible to perform the print processing depending on the abnormality checking results. When it is determined that the engine 200 is not abnormal or the engine has such a minor abnormality as not to influence the print processing, the engine CPU awaits a next print request. When receiving a next print request from the controller CPU 105 within the second waiting time, the engine CPU 201 makes transition to the print processing period Tb, in which the print processing is performed at the print request. If the engine CPU 201 does not receive a next page print request within the second waiting time, the engine CPU starts to perform the print process termination processing for the purpose of failsafe.

When it is determined that the engine has an abnormality such that the print processing cannot be performed, the engine CPU 201 starts to perform the print process termination processing for the purpose of failsafe. The relationship between the abnormalities and execution/in execution of the print processing is previously stored as a table in a nonvolatile memory or the like of the engine 200.

By using this method, the engine CPU 201 can relatively rapidly start the print process termination processing compared to a method in which upon receipt of a next page print request in the waiting time, the print process termination processing starts to be performed and then the start-up processing is performed again. Therefore, by using this method, it is possible to save time, and the printing process can be rapidly performed properly.

Further, it is possible to turn on/off each or all of the functions of the laser printer 1 of performing processings in the second waiting time set by the engine CPU 201 while stopping start of the print process termination processing to await a next print request, using one or more keys provided on the operation panel 7. By using this method, the convenience of the laser printer 1 can be enhanced.

Hereinbefore, the present invention has been explained by reference to an electrophotographic image forming apparatus (laser printer 1). However, the present invention is not limited thereto, and can be applied to an image forming apparatus in which upon receipt of a print request for a page, print process devices are initiated to perform a print processing for the page, wherein when receiving no print request within a predetermined waiting time even after performing the print processing for the page, the termination processing is performed on the print process devices. For example, the present invention can also be applied to an inkjet image forming apparatus performing such print processing as mentioned above.

Thus, the present invention relates to an image forming apparatus such as printers, facsimiles, copiers, and complex image forming machines, in which print data for plural pages are processed to print images while performing a start-up processing and a termination processing on print process devices; an image formation controlling method; an image formation control program; and a computer readable medium storing computer instructions for performing the image formation controlling method.

This document claims priority and contains subject matter related to Japanese Patent Application No. 2008-151132, filed on Jun. 9, 2008, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An image forming apparatus comprising:

a controller which generates image data of a page and a print control signal including print condition information concerning the image data of the page and outputs the image data and the print control signal together with a print request; and an engine which drives plural print process devices to perform a print processing of printing an image on a receiving material according to the image data upon receipt of the print request, the image data and the print control signal from the controller, wherein the engine includes an initiating device configured to initiate the print process devices upon receipt of the print request, a print performing device configured to print the image on the receiving material according to the image data using the print process devices;

a print process termination device configured to terminate the initiated plural print process devices, an inquiry device configured to send an inquiry to the controller to inquire the controller whether there is a next page image to be printed, when a next page print request is not received within a predetermined waiting time, a print process controller, which sets a predetermined second waiting time upon receipt of a response from the controller such that there are next page image data while stopping termination of the plural print process devices, which is to be performed by the print process termination device, for the predetermined second waiting time to await the print request for the next page image, and a print condition information obtainment requesting device configured to request the controller to obtain one or more pieces of the print condition information concerning the next page image data, wherein the print process controller is configured to control the print process termination device according to information on pixel density of the image of the next page included in the print condition information sent from the controller when the print condition information obtainment request is made.

2. The image forming apparatus according to claim 1, wherein the print process controller controls the print process termination device when pixel density of the image data printed is different from the pixel density of the next page image data.

3. The image forming apparatus according to claim 1, wherein the one or more pieces of the print condition information include information on kind of the receiving material, and wherein the print process controller judges whether or not it is necessary to change a speed at feeding the receiving material on the basis of the information on kind of the receiving material sent from the controller, and wherein when determining that it is necessary to change the speed, the print process controller controls the print process termination device to terminate the plural print process devices.

4. The image forming apparatus according to claim 1, wherein the controller includes a page memory configured to expand the image data page by page, and the engine further includes an expansion ending time estimation requesting device configured to request the controller to estimate an expansion ending time at which the image data for the next page are expanded in the page memory in such an amount that the image data can be sent to the engine, and wherein the print process controller determines the second waiting time on the basis of information on the expansion ending time sent from the controller.

5. The image forming apparatus according to claim 1, wherein the print process controller checks whether or not the engine is abnormal in the waiting time or the second waiting time, and wherein when the engine is abnormal, the print process controller controls the print process termination device to terminate the plural print process devices.

6. An image formation controlling method for controlling image formation of an image forming apparatus, which includes a controller which generates image data of a page and a print control signal including printing condition information concerning the image data of the page and outputs the image data and the print control signal together with a print request, and an engine which drives plural print process devices to perform a print processing of printing an image on a receiving material according to the image data upon receipt of the print request, the image data and the print control signal from the controller, said image formation controlling method comprising:

initiating the plural print process devices of the engine upon receipt of the print request together with image data and the print control signal from the controller;

performing the print processing using the print process devices upon receipt of the print request, the image data and the print control signal;

terminating the initiated print process devices;

sending an inquiry to the controller to inquire the controller whether there is a next page image to be printed, when the engine does not receive the print request for the next page image within a predetermined waiting time;

performing print process controlling by setting a predetermined second waiting time upon receipt of a response from the controller such that there are next page image data while stopping termination of the print process devices of the engine for the predetermined second waiting time to await the print request for the next page image from the controller; and requesting the controller to obtain one or more pieces of the print condition information concerning the next page image data, wherein the performing print process controlling step further includes determining termination of the initiated plural print process devices according to information on pixel density of the image of the next page included in the print condition information sent from the controller when the requesting is made.

7. The image formation controlling method according to claim 6, wherein the performing print process controlling step further includes determining termination of the initiated plural print process devices when pixel density of the image data printed is different from the pixel density of the next page image data.

8. The image formation controlling method according to claim 6, wherein the one or more pieces of the print condition information in the requesting step include information on kind of the receiving material, and wherein the determining termination step includes judging whether or not it is necessary to change a speed at feeding the receiving material on the basis of the kind of the receiving material, and determining termination of the initiated plural print process devices in such a way that when determining that it is necessary to change the speed, the plural print process devices are terminated.

9. The image formation controlling method according to claim 6, further comprising:

requesting the controller to estimate an expansion ending time at which the image data for the next page image are expanded in a page memory in such an amount that the image data can be sent to the engine, wherein in the performing print process controlling step, the second waiting time is determined on the basis of information on the expansion ending time sent from the controller.

10. A non-transitory computer readable medium storing computer instructions, wherein the instructions, when executed by a computer, cause the computer to perform an image formation controlling method for controlling image formation of an image forming apparatus, which includes a controller which generates image data of a page and a print control signal including printing condition information concerning the image data of the page and outputs the image data and the print control signal together with a print request, and an engine which drives plural print process devices to perform a print processing of printing an image on a receiving material according to the image data upon receipt of the print request, the image data and the print control signal from the controller, said image formation controlling method comprising:

initiating the plural print process devices of the engine upon receipt of the print request together with image data and the print control signal from the controller;

performing the print processing using the print process devices upon receipt of the print request, the image data and the print control signal;

terminating the initiated print process devices;

sending an inquiry to the controller to inquire the controller whether there is a next page image to be printed, when the engine does not receive the print request for the next page image within a predetermined waiting time;

performing print process controlling by setting a predetermined second waiting time upon receipt of a response from the controller such that there are next page image data while stopping termination of the print process devices of the engine for the predetermined second waiting time to await the print request for the next page image from the controller; and requesting the controller to obtain one or more pieces of the print condition information concerning the next page image data, wherein the performing print process controlling step further includes determining termination of the initiated plural print process devices according to information on pixel density of the image of the next page included in the print condition information sent from the controller when the requesting is made.

11. The image forming apparatus according to claim 1, wherein the controller includes an engine interface, the engine further includes a controller interface, and the inquiry device sends the inquiry to the controller by sending the inquiry through the controller interface of the engine to the engine interface of the controller.

* * * * *